July 5, 1960 C W. MUSSER 2,943,495
MEANS FOR PRODUCING MOTION THROUGH SEALED WALL
Filed March 31, 1958
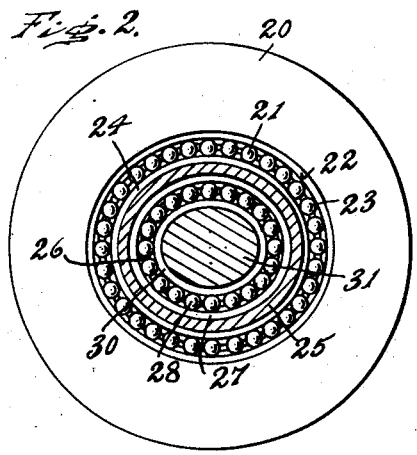
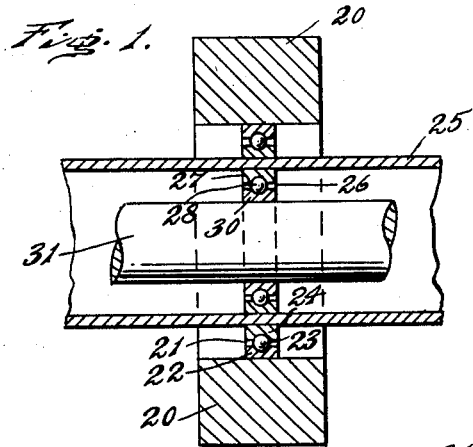
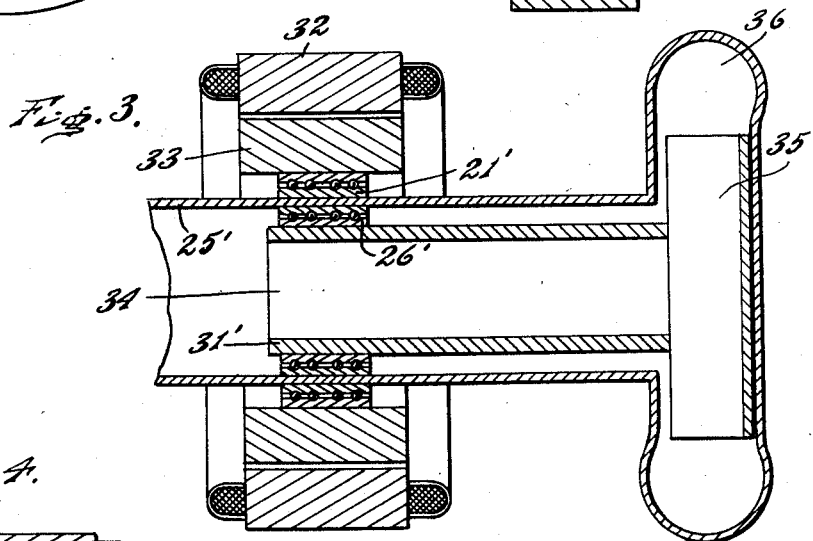
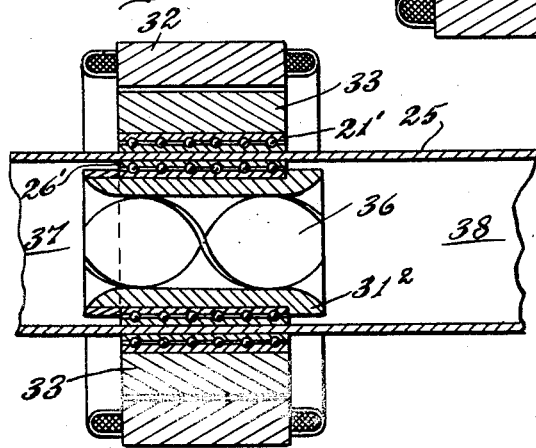
INVENTOR
C Walton Musser
BY
ATTORNEYS.

United States Patent Office 2,943,495
Patented July 5, 1960

2,943,495

MEANS FOR PRODUCING MOTION THROUGH SEALED WALL

C Walton Musser, Beverly, Mass., assignor to United Shoe Machinery Corporation, Boston, Mass., a corporation of New Jersey Filed Mar. 31, 1958, Ser. No. 725,216

3 Claims. (Cl. 74—17.8)

The present invention relates to mechanism for transmitting rotational motion through a tubular wall.

When reference is made herein to a sealed wall or tubular wall, it is intended to indicate that the wall may be a portion of the wall of a vessel, container, housing, casing, enclosure, or otherwise, which may be utilized in any of a wide variety of applications as later explained.

A purpose of the present invention is to produce rotary motion directly through a sealed or closed wall.

A further purpose is to interrelate in invariable phase relationship a member free to rotate on the outside of a pressure type wall to a member free to rotate inside the wall so that rotation of either of these members will cause rotation of the other.

A further purpose is to transmit rotational motion through a vessel wall without slippage between the driving and driven elements.

A further purpose is to secure freedom from backlash in transmitting rotational motion through a wall.

A further purpose is to secure extremely precise transmission of rotational motion.

A further purpose is to eliminate the need for gears in the transmission of rotational motion.

A further purpose is to utilize standard anti-friction bearings, such as ball or roller bearings in transmitting rotational motion through a pressure tight wall.

A further purpose is to obtain high efficiency in rotational transfer of motion through a wall.

A further purpose is to provide a power transmitting device which is of very high torque capabilities, being limited only by the capabilities of the bearings employed.

A further purpose is to secure a motion transmitting system which is very adaptable and requires few parts.

A further purpose is to manufacture a motion transmitting device by simple manufacturing techniques.

A further purpose is to transmit rotational motion quietly.

A further purpose is to construct a rotational motion transmitting device which has an external elliptoidal member which in turn surrounds a tube and which has an internal elliptoidal member within the tube and coaxial to the external elliptoidal member that the rotation of either one of the elliptoidal members will cause rotation of the other.

In the drawings I have chosen to illustrate a few only of the numerous embodiments in which the invention may appear, selecting the forms shown from the standpoints of convenience in illustration, satisfactory operation, and clear demonstration of the principles involved.

Figure 1 is a diagrammatic axial section of one embodiment of the device according to the invention.

Figure 2 is a transverse sectional end elevation of the device of Figure 1.

Figure 3 is a diagrammatic axial section of a centrifugal pump embodying the device of the invention.

Figure 4 is a diagrammatic axial section of an axial flow pump in accordance with the invention.

Describing in illustration and not in limitation and referring to the drawings:

In the prior art, motion has usually been transmitted through sealed pressure tight walls by electric induction, by magnetic force, or by imparting motion through packing glands or seals or through diaphragms. In the case of electric induction and magnetic force, limitations are imposed as to the magnitude of the force transmitted, as to the permissible thickness of the wall and as to the temperature range which is permissible. Seals are often limited in effectiveness, especially where great pressure tightness is required, and diaphragms are limited as to the permissible physical dimensions and as to the pressure differential which can be maintained. One of the most satisfactory devices as of the present time is an electric motor having the sealed container located between the stator and the rotor. Since the container is placed in the air gap of the motor, it should be of nonmagnetic material. In order to be satisfactory, a device of this kind must be quite large and must operate at moderate or high speeds. This requires speed reductions in many instances, and the location of speed reductions in chemical atmospheres and under high temperatures is often undesirable. In addition, there is a problem due to the need for bearings inside the sealed container and the difficulty in providing lubrication which is adequate at the particular speed.

Many of the prior art devices necessitate the use of complicated mechanism inside the container, including levers, bearings, gears, nuts, screws, and the like. Where the content of the container is likely to cause corrosion, or contamination, or where high temperatures or marked temperature differentials are required, it is often difficult to produce equipment which performs satisfactorily in service.

By the present invention, it is possible to transmit rotational motion through a sealed tube or container wall, which is sometimes referred to as a hermetically sealed wall, without limitation as to whether or not the material of the wall is magnetic or nonmagnetic, and without great limitation as to thickness. Furthermore, the mechanism of the invention is structurally of the utmost simplicity, so that elevated temperatures, corrosion, chemical reaction mixtures, elevated pressures, and materials which are contaminated by air or which are dangerous to life when they escape from the container, will not interfere with functioning even after prolonged service. The device of the invention is economical of space within the sealed wall, as few parts are required and the space required for moving parts inside the container is held to a minimum.

In accordance with the present invention, rotational motion is propagated as a wave of deflection from a wave generator which may be either inside or outside to a cooperating machine element which may be either outside or inside.

As the device is expected to find its most widespread use to transmit motion into a container, the description herein is largely directed to the use of an external wave generator, but it will be understood that the device can be employed in reverse, placing the wave generator inside if desired.

The wave of deflection is actually superimposed on the circumference of the tubular wall, preferably though not necessarily through the intervention of an antifriction bearing which is maintained in elliptoidal contour by a wave generator element surrounding such bearing. The motion inside the wall is taken off by a machine element such as a shaft, rotor, impeller, or the like, which is maintained in invariable rotational relationship with the wave generator, preferably by an elliptoidal bearing. The bearings and the tubular wall are thus coaxial and the waves in the elliptoidal contours are thus in phase.

When reference is made herein to an elliptoid it is intended to indicate a contour which resembles an ellipse, but which differs therefrom in that it includes two wave lengths, usually but not necessarily sine waves, which are superimposed on a circle in 360°.

It should be evident that in the preferred embodiment the tubular wall, the inner race of the outer bearing and the outer race of the inner bearing are not caused to rotate but merely undergo radial wave motion under the deflection of the wave generator. It will be evident, however, that if for reasons apart from the present invention it is desired to rotate the tubular wall, as to accomplish some other internal adjustment or otherwise, this can well be done without defeating the motion transmission of the present invention.

The transmission of rotational motion to transmit either motion or power through a tubular wall is believed to be novel in accordance with the present invention. As the wave of deflection moves around the sealed wall, each segment of the wall moves radially in and out, tracing during this motion a curve which is generally of sinusoidal character, in the preferred form, but which can suitably deviate from a true sinusoidal wave within reasonable limits as desired.

Considering first the simplest form of the invention as shown in Figures 1 and 2, there is shown an external wave generator consisting of a relatively rigid ring 20, having an inner elliptoidal contour, and which, where it is the driving member, may be driven in any suitable way as by engaging it as a pulley by a belt, or by providing gear teeth on the exterior, or otherwise. The inside of the ring engages the outer race 22 of an antifriction bearing 21, here shown as a ball bearing having uniform balls 23 and an inner race 24. The outer and inner races 22 and 24 are deflected into elliptoidal contours, and the bearing may be produced by deflecting a standard ball bearing into the contour shown and forcing it into the elliptoidal space inside the relatively rigid ring 20.

The inner race 24 has an inner surface which closely conforms to the outside of a tubular wall 25, which is suitably the wall of a vessel or a container or the side of a casing or housing as previously explained, and is suitably sealed at the ends in any manner not shown.

While it is preferable to obtain relatively low friction by using an antifriction bearing in the wave generator as just described, it will be evident of course that where the operating conditions will permit greater friction it is unimportant in the present invention whether an antifriction bearing is used or whether the interior of the ring 20 directly engages and deflects the tubular wall.

While of course it will be evident that it is not critical in the present invention how the motion transmitted through the wall is taken off and utilized, it is preferable to reduce friction by providing an antifriction bearing 26 within the tubular wall rather than by engaging the tubular wall directly with the elliptoidal exterior contour of a shaft or other drive element.

In the form of Figures 1 and 2 the inner bearing comprises an outer race 27, bearing elements, suitably uniform balls 28, and an inner race 30 tightly fitting the power output. The outer race 27 is elliptoidal, as well as the inner race 30, and the inner bearing is desirably a standard round bearing which is forced into the elliptoidal contour. All of the elliptoidal elements including the tubular wall 25 are coaxial as shown.

In most cases it will be desirable to produce the various elements of plain carbon or alloy steel, stainless steel, bronze, or other structural metal, although it will be evident that if desired the components can be made of other materials required in special cases. For example, the tubular wall may be formed of polytetrafluorethylene, or of polyethylene, or of rubber or synthetic rubber. In most cases the conventional bearing steels will be preferred for the bearings, as for example AISI 52100.

It will be evident that the external elliptoidal ring 20 is essentially a thick ring having an elliptoidal inner bore which is capable of holding the outer bearing constantly deflected into the elliptoidal form, keeping the inner bore of the inner race 24 elliptoidal. The ring 20 also constantly maintains a deflecting force which holds the tubular wall elliptoidal, and contributes to the deflecting force which holds the outer race of the inner bearing elliptoidal, although the elliptoidal form of the inner bearing is assured by the elliptoidal cross section of the output shaft 31.

It will of course be evident that the inner bearing, besides performing this function in transmitting motion, acts as a journal bearing for the output shaft 31.

In operation, the tubular wall 25 is held stationary (unless it is moved for some other reason) and in the preferred form the external elliptoidal ring 20 is rotated by mechanical, electrical or other means. The outer race 22 is in fixed relation to the ring 20 by the friction of its forced fit. Likewise the inner race 24 of the outer bearing and the outer race 27 of the inner bearing 26 are in fixed relation to the tubular wall 25 by reason of forced fits. The inner race 30 of the inner bearing 26 is in fixed relation to the output shaft 31 by its forced fit engagement. Since the wall 25 and consequently the races 24 and 27 are fixed in space, rotation of the ring 20 and consequent rotation of the outer race 22 causes the ball or other bearing elements 23 to roll and deflects the race 24 radially to the elliptoid of the race 22, at the same time deflecting the tubular wall 25 and the outer race 27 of the inner bearing. This causes the bearing elements or balls 28 of the inner bearing to rotate and drives the shaft 31. It will be evident that the inner and outer elements are keyed or locked together through the tubular wall, so that one revolution of the member on the outside will correspond to one revolution of the shaft 31.

While the above description indicates that the inner element is being driven, it will be evident also that the shaft 31 can drive the outer element.

In Figure 3 an electric motor, suitably of squirrel cage type, has a stator or motor field 32 of conventional character surrounding a squirrel cage rotor 33, which is of conventional character except that it is relatively rigid and provided with an elliptoidal inner hole which fits around the outer race of an outer bearing 21' of elliptoidal form similar to the construction of Figures 1 and 2 except that it has multiple ball sets. The elliptoidal outer bearing 21' deflects tubular wall 25', which surrounds and engages the outside of the outer race of inner multiple ball bearing 26' of elliptoidal form, which is pressed on the elliptoidal exterior of a driven element. It is evident here that the bearings perform a dual role since they act as normal journal bearings and also transmit rotational movement as described.

The driven element in Figure 3 constitutes a pump having an inlet at 34 through the center of a tubular shaft 31', and having impeller vanes 35 which discharge into an outlet 36 surrounding the impeller. The illustration here made of a centrifugal pump is intended merely to be diagrammatic.

Figure 4 illustrates an axial flow pump in which the driven element $31^2$ has an elliptoidal exterior contour and mounts, at the inside of the hollow shaft, suitable helical propeller blades 36 which move fluid from an inlet at 37 through a channel around the blades 36 to an outlet at 38. The drive includes the same squirrel cage motor as in Figure 3.

No attempt has been made in the form of Figure 4 to illustrate seals of the character conventionally used at the ends of the inner bearings.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a motion transmitting device, a radially flexible tubular wall having a contour which generally conforms to a circle on which are superimposed two wave lengths in 360°, a wave generator telescoping with respect to the tubular wall and having a surface which engages one side of the tubular wall and likewise conforms to the shape of a circle on which are superimposed two wave lengths in 360°, said waves on the wave generator being in phase with the waves on the tubular wall, a follower on the other side of the tubular wall telescoping with respect to the tubular wall, having a surface which engages the tubular wall and which also conforms to the shape of a circle on which are superimposed two wave lengths in 360°, said waves on the follower being in phase with the waves on the tubular wall, the tubular wall, the wave generator and the follower all being and remaining coaxial, and means for turning the wave generator and thereby propagating a wave around the tubular wall and turning the follower on the other side of the tubular wall about the common axis.

2. In a motion transmitting device, a radially flexible tubular wall having a cross section which conforms to a circle on which two sine wave lengths have been superimposed in 360°, a wave generator in telescoping relation with the tubular wall and which conforms in cross section to a circle on which two sine wave lengths have been superimposed in 360°, in phase with the sine waves on the tubular wall, and a follower in telescoping relation with the tubular wall and having a surface which engages the opposite side of the tubular wall from the wave generator, which follower surface conforms to a circle on which two sine wave lengths have been superimposed in 360°, in phase with the sine waves on the tubular wall, said tubular wall, wave generator and follower being and remaining coaxial, and means for turning the wave generator about the common axis and thereby transmitting a wave around the tubular wall and turning the follower on the other side of the tubular wall about the common axis.

3. A motion transmitting device, comprising a radially flexible tubular wall having a cross section which generally conforms to a circle on which two wave lengths have been superimposed in 360°, a wave generator including an antifriction bearing having inner and outer race surfaces and antifriction bearing round elements between the race surfaces, said wave generator bearing being in telescoping relation with the tubular wall and one of the race surfaces adjoining one side of the tubular wall, the wave generator bearing having a cross section which generally conforms to a circle on which two wave lengths have been superimposed in 360°, said waves on the wave generator being in phase with the waves on the tubular wall, and a follower including an antifriction bearing having inner and outer race surfaces, and antifriction bearing round elements between the race surfaces, said follower bearing being in telescoping relation with the tubular wall and one of said race surfaces of the follower bearing adjoining the side of the tubular wall remote from the wave generator bearing, the cross section of the follower bearing conforming generally to a circle on which two wave lengths have been superimposed in 360°, the waves on the follower bearing being in phase with the waves on the tubular wall, said tubular wall, wave generator bearing and follower bearing being and remaining coaxial, and means for turning the wave generator and transmitting a wave around the tubular wall and turning the follower bearing on the other side of the tubular wall.

References Cited in the file of this patent

UNITED STATES PATENTS

| | | |
|---|---|---|
| 2,307,317 | Konig | Jan. 5, 1943 |
| 2,497,867 | Cymmer | Feb. 21, 1950 |
| 2,610,525 | Sprigg | Sept. 16, 1952 |